Figure 1:
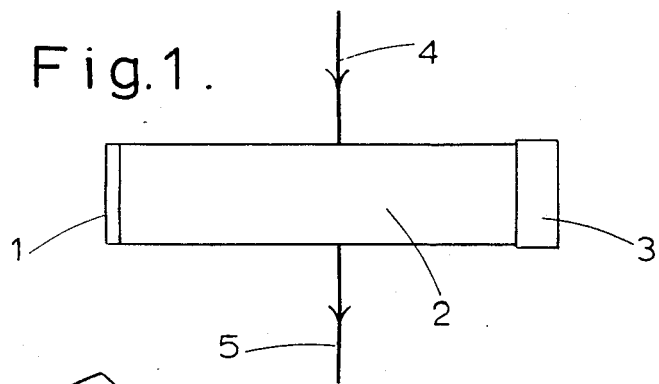

United States Patent [19]
Dyott

[11] 3,897,135
[45] July 29, 1975

[54] OPTICAL COMMUNICATIONS SYSTEMS
[75] Inventor: Richard Burnaby Dyott, London, England
[73] Assignee: The Post Office, London, England
[22] Filed: July 26, 1973
[21] Appl. No.: 382,865

[30] Foreign Application Priority Data
  July 28, 1972  United Kingdom............... 35372/72

[52] U.S. Cl....... 350/96 C; 331/94.5 C; 331/94.5 H
[51] Int. Cl. .......................... G02b 5/14; H01s 3/00
[58] Field of Search .................... 350/96 WG, 96 C; 331/94.5 C, 94.5 H

[56] References Cited
UNITED STATES PATENTS

| | | | |
|---|---|---|---|
| 2,849,692 | 8/1958 | Fox | 350/96 WG |
| 3,456,211 | 7/1969 | Koester | 331/94.5 C |
| 3,579,316 | 5/1971 | Dyott et al. | 331/94.5 C |
| 3,590,248 | 6/1971 | Chatterton, Jr. | 331/94.5 C |
| 3,617,930 | 11/1971 | Snitzer et al. | 331/94.5 C |
| 3,803,511 | 4/1974 | Thompson | 350/96 WG |

FOREIGN PATENTS OR APPLICATIONS
1,564,880  5/1970  Germany

Primary Examiner—Ronald L. Wibert
Assistant Examiner—Conrad Clark
Attorney, Agent, or Firm—Kemon, Palmer and Estabrook

[57] ABSTRACT

A Ga As laser for coupling energy into a dielectric optical waveguide, has one face of its optical resonant cavity coated with a blooming to give near zero reflectivity. The blooming is formed by depositing a transparent material e.g. alumina, onto one face of the laser while it is lasing, and stopping the deposition when the laser ceases to lase. The other face of the optical cavity has a reflective coating. When a coupling unit, for example, a tapered section of dielectric optical waveguide having a partially reflective coating on one end is bought up to the laser, the laser lases in line with the coupling unit only. This filamentary section of laser acts in some respects like a dielectric optical waveguide itself. Other forms of coupling can be a length of dielectric optical waveguide having a large refractive index difference between core and cladding, with or without a partially reflective coating, or an elliptic sectioned length of dielectric optical waveguide.

8 Claims, 10 Drawing Figures

OPTICAL COMMUNICATIONS SYSTEMS

This invention relates to apparatus for and methods of launching optical energy beams into optical transmission fibres.

The term "optical" where used in this specification is to be understood as covering the regions of the electro-magnetic spectrum usually designated as the infra-red, visible, and ultra-violet.

The term "bloomed" as used in this specification refers to the placing of a coating of transparent material on a surface to enhance its transmissivity to electro-magnetic radiation. Such a coating, referred to as a blooming, should ideally have a thickness of $\lambda/4$ where $\lambda$ is the wavelength of the electro-magnetic radiation used, and a refractive index of $(n_1.n_2)^{1/2}$, where $n_1$ is the refractive index on one side of the surface and $n_2$ is the refractive index on the other side of the surface.

The term "substantually elliptic" is to be understood as including any section whose thickness or minor diameter is less than its width or major diameter eg. it includes within its ambit a rectangular section.

One of the principal problems encountered in the construction of optical communications systems using dielectric optical waveguides, is feeding the optical energy into the waveguide in an efficient manner. This requires the optical energy to be concentrated onto the core of the dielectric optical waveguide which may have a diameter of the order of 2 microns. Prior art devices for coupling optical radiation from a laser into a dielectric optical waveguide usually involve butting the end of the dielectric optical waveguide or fibre against the laser. When this is done a considerable amount of radiation is wasted, because the active region of the laser overlaps the dielectric optical waveguide. More energy may be lost because energy is coupled into radiative modes of the dielectric optical waveguide.

It is an object of the invention to overcome the disadvantages described above of known devices, for coupling energy into dielectric optical waveguides.

It is also an object of the present invention to provide a method of and apparatus for coupling energy from a laser into a dielectric optical waveguide.

It is a further object of the present invention to provide a method of and apparatus for causing a laser to lase only in portions of the active medium of the laser in alignment with an externally positioned dielectric optical waveguide.

When the energy source used is a Ga As laser this problem may be solved by utilizing a certain property of the laser. However it is anticipated that the invention will work with lasers other than Ga As lasers.

As the current applied across the active junction of a Ga As laser is increased, lasing filaments appear in the laser, i.e. light is generated along fine filaments within the laser. As the applied current is further increased the refractive index of the laser material in which the onset of lasing action has not occurred falls, while in the lasing filaments little or no change in refractive index occurs. Thus the lasing filaments behave as though they were dielectric optical waveguides. If a method could be devised of ensuring that the lasing filaments were formed in alignment with an optical waveguide, optical energy generated by the laser would be transferred to the waveguide with minimum loss. It is on this principal that the present invention operates.

A Ga As laser for coupling energy into a dielectric optical waveguide, has one face of its resonant cavity coated with a blooming, so that the reflection coefficient at that face is near zero. Such a coating may be formed by depositing a transparent material e.g. alumina onto one face of the laser while it is lasing, and stopping the deposition when the laser ceases to lase. The other face of the optical resonant cavity has a reflective coating. Such a laser is only capable of lasing when an external reflecting surface is placed adjacent the bloomed face of the laser. When this is done the lasing action within the laser is confined to a tube or filament. Thus when a coupling unit, for example a tapered section of dielectric optical waveguide is placed in close proximity to the bloomed face of the laser, a tube is formed within the laser in which lasing occurs, this being aligned with a coupler. This ensures that most of the optical energy generated in the laser is coupled into the coupling unit. Other forms of coupling can be a length of dielectric optical waveguide having a large refractive index difference between core and cladding, with or without a partially reflective coating over the core, or an elliptic sectioned length of dielectric optical waveguide.

According to a first aspect of the invention there is provided a method of launching optical energy in a dielectric optical waveguide from a laser having an optical resonant cavity defined by a reflective first surface and a bloomed second surface, comprising the steps of:

a. energising the laser so that it is capable of lasing when an at least partially reflective surface is placed adjacent said second surface, b. positioning an end section of dielectric optical waveguide adjacent said second surface so that lasing action is induced in said laser.

According to a second aspect of the present invention there is provided a device for launching optical waveguide comprising a laser having an optical resonant cavity defined by a reflective first surface and a bloomed second surface, and a dielectric optical waveguide having an end section adjacent said second surface.

The invention will now be described, by way of example, with reference to the accompanying drawings, in which:

FIG. 1 shows a schematic representation in section of a Ga As laser as modified for use in the invention.

Figure 2:
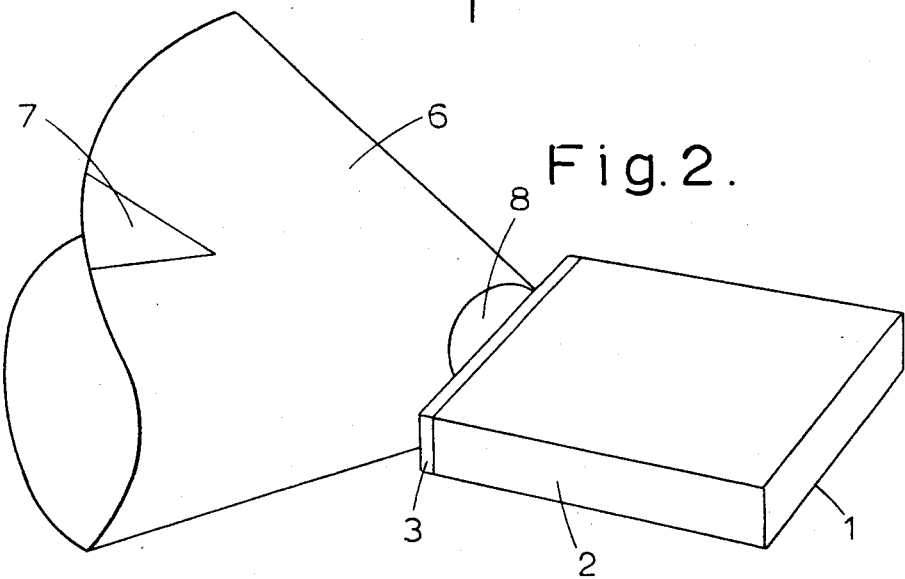
Figure 3A:
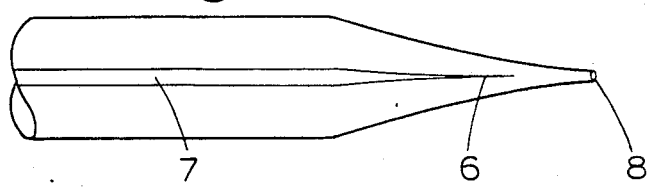
Figure 3B:
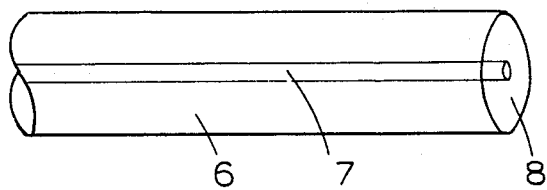
Figure 4A:
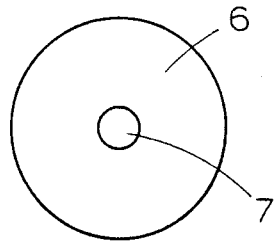
Figure 4B:
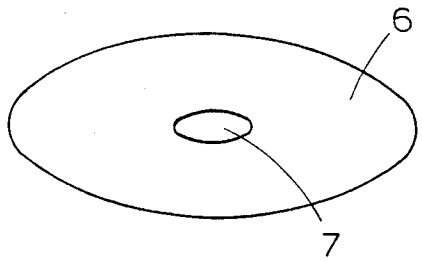
Figure 5:
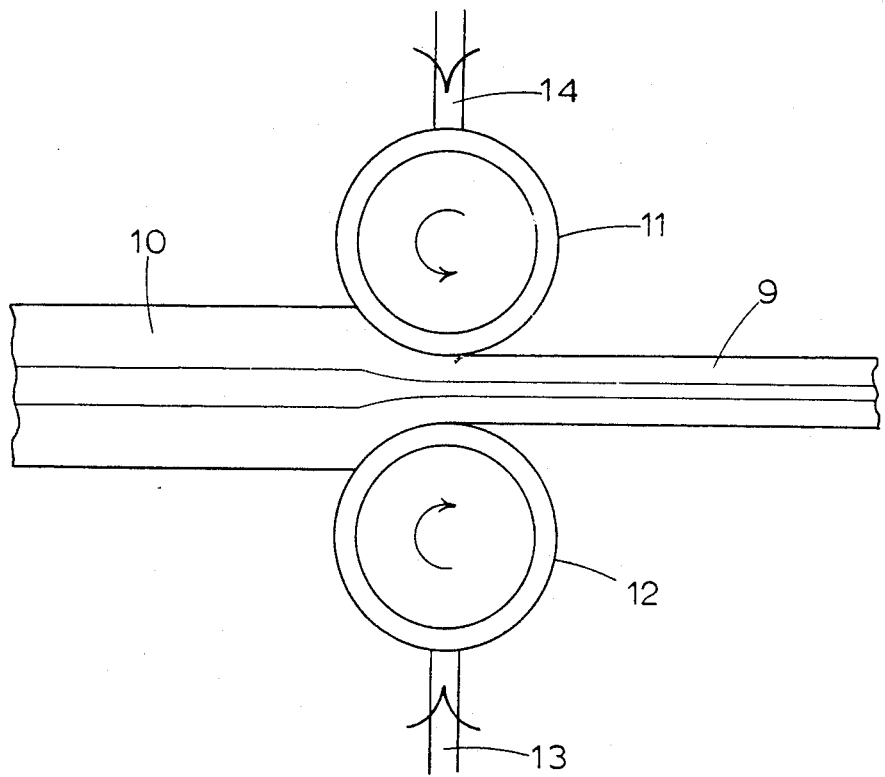
Figure 6:
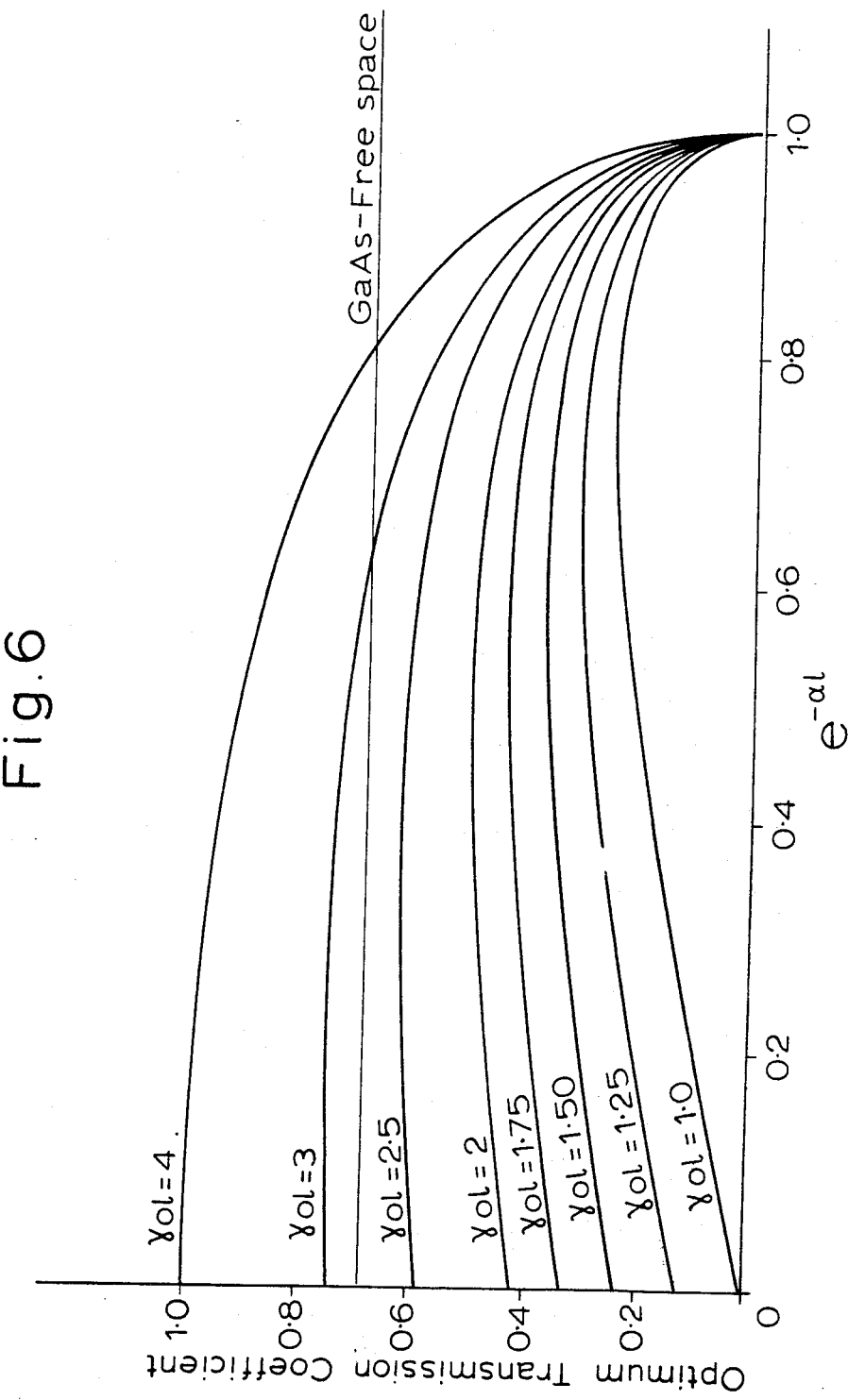
Figure 7:
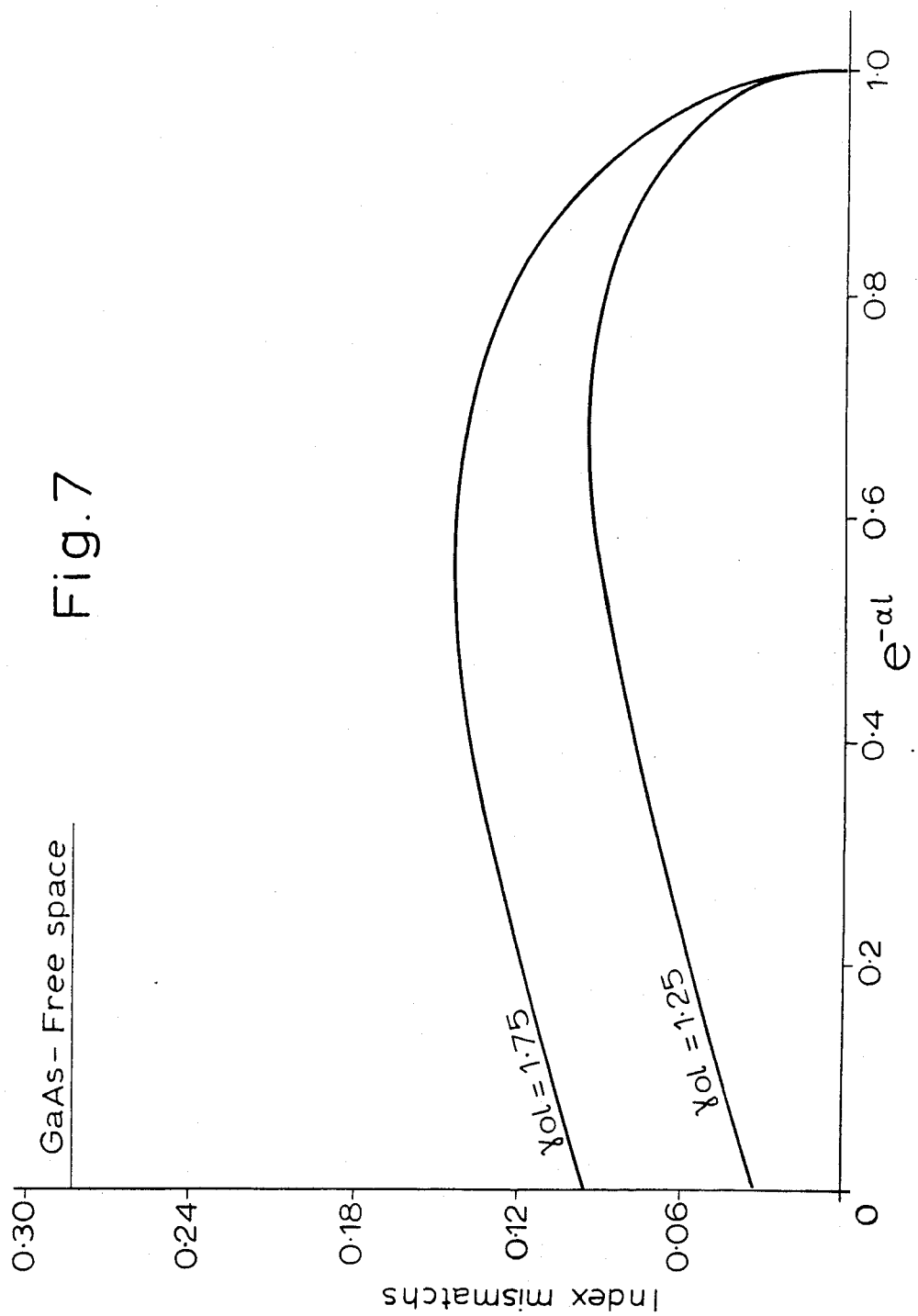

FIG. 2 shows one form of dielectric optical waveguide aligned with a Ga As laser, FIG. 3a and FIG. 3b show two examples of terminations in transverse section of dielectric optical waveguides into which optical energy may be launched from a Ga As laser, FIG. 4a and FIG. 4b show two examples of dielectric optical waveguides in lateral section which may be used in the present invention, FIG. 5 is a schematic representation of a method of producing the dielectric optical waveguide illustrated in FIG. 4b, FIG. 6 is a graph showing the variation of the optimum transmission co-efficient for a Ga As laser end face with loss, FIG. 7 is a graph of refractive index miss match for a Ga As laser for maximum output plotted against loss.

Figure 8:
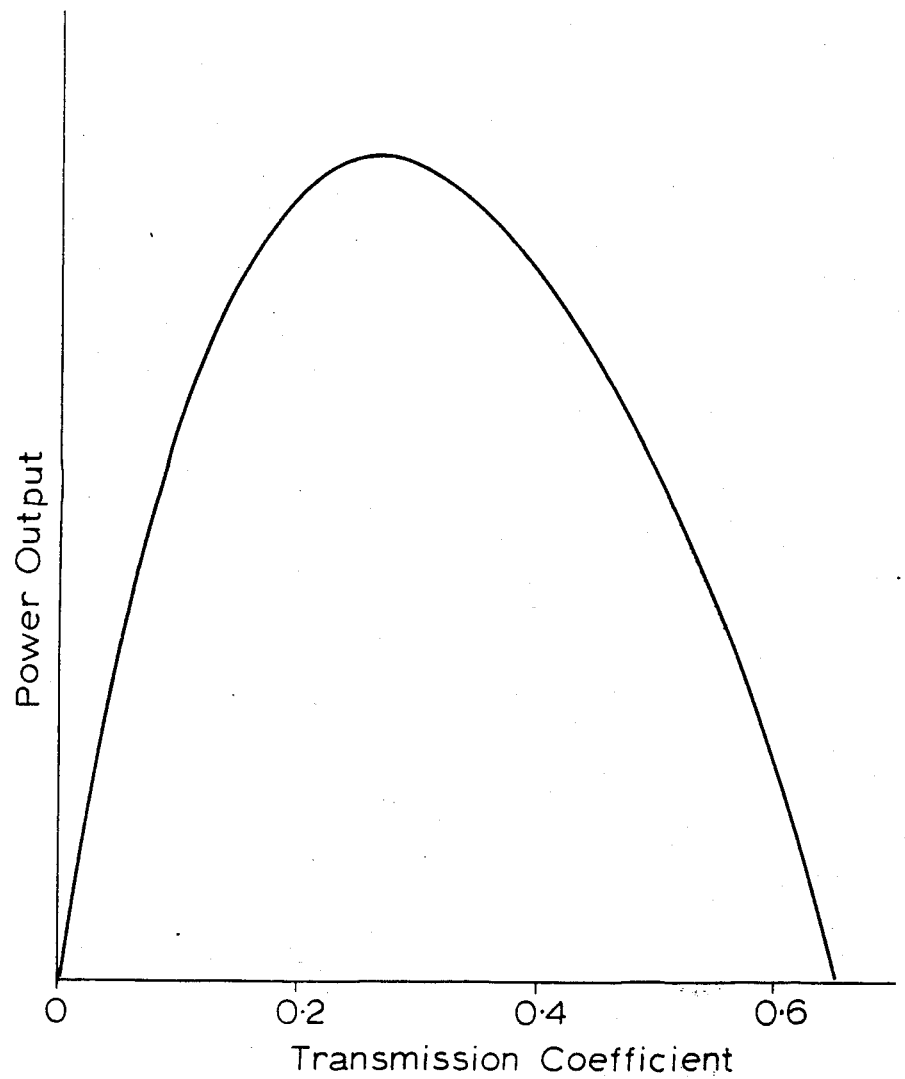

FIG. 8 is a graph showing the variation of normalised powder output of a Ga As laser as a function of transmission co-efficient.

The means that have been suggested so far for the coupling of a double hetro junction Ga As laser to a single mode dielectric optical waveguide have accepted as inevitable a considerable radiation loss at the interface due to the large differences in optical geometry between laser and dielectric optical waveguide. It has been suggested that the filaments that occur in Ga As lasers are self-forming optical waveguides whose locations are fixed by random imperfections at the faces or within the material. Attempts to confine the lasing action by stripped or mesa geometry show that there are still some six or so filaments present when the width is as small as 20 microns. The filaments have diameters of about 2 to 3 microns and it would seem worthwhile to try to couple a single filament to a dielectric optical waveguide, making sure that the laser resonator is correctly matched to the fibre transmission line, and at the same time suppressing all other filaments.

Each laser filament can be thought of as an optical waveguide resonator with a length equal to that of the laser (about 300 microns) and with the reflections at the end faces determined by the difference in index between Ga As and the surrounding medium. If the surrounding medium is free space then the power reflection coefficient from the interface can be expressed as:

$$R = \left[\frac{1-S}{1+S}\right]^2 = (0.55)^2 = 0.308$$

Where:
$S$ = ratio of indices = $n_1/n_2$,
$n_1$ = 1 (free space)
$n_2$ = equivalent index of the laser filament, ≃ 3.5.

or rather less than one-third of the power is reflected. This is not necessarily the optimum reflection coefficient for the laser.

When the surrounding medium is free space, then butting a glass fibre against the end face of the laser decreases the reflection coeffficient and therefore discourages the formation of a filament at that point. In practice the situation is complicated by the presence of a small air gap, almost impossible to eliminate without some matching liquid, between the fibre and the laser end face.

A Ga As laser in accordance with one aspect of the present invention is shown in schemmatic form in FIG. 1. A conventional Ga As laser 2, through which current is fed by leads 4 and 5, has a metallic reflecting coating 1 deposited on one end. The coating may be of silver or aluminium, alternatively a multiple dielectric layer may be used. At the other end of the laser a bloomed coating 3 is formed. This coating has a thickness equal to or slightly less than λ/4 where λ is the wavelength of electro-magnetic radiation produced by the Ga As laser, and the coating has a refractive index of $(n_1.n_2)^{1/2}$ where $n_1$ is the refractive index of Ga As, where $n_2$ is the refractive index of free space ie 1. A suitable material for use as the coating is alumina. This coating produces a surface having substantially zero reflectivity at one end of the laser, which destroys the Q of the laser cavity and inhibits laser action. The Q may of course be restored by placing a reflecting surface of some form at or near the bloomed surface of the laser.

The reflecting coating 1 is produced by vacuum deposition of an appropriate material in a known manner. The quarter wave bloomed coating 3 is formed by vacuum deposition of alumina on the end surface of the laser. The thickness of the coating must be accurately controlled to ensure optimum reflectivity. This can be achieved by initiating laser action, prior to the deposition of the alumina, and slowly building up the film thickness until lasing action is stopped. When this condition is attained the reflectivity of the surface has fallen to a point where the Q-factor of the laser cavity can no longer support lasing. Although the coating thickness may still be less than λ/4, the fact that lasting action is inhibited indicates that the reflectivity of the coating is sufficiently low for the purpose of the invention. In order to achieve coupling between the laser and a dielectric optical waveguide a special termination to the dielectric optical waveguide is provided. One form of such a termination is shown in FIG. 3a. In this termination the dielectric optical waveguide, about 25 microns in diameter, is drawn down until the overall diameter of its end is about equal to that of the original core, ie less than 5 microns. The core in the tapered region 6 also reduces in diameter, and effectively vanishes before the end of the taper ie it becomes too small to support wave propagation. The optical wave propagating through the glass is thus compelled to travel through the cladding. The free end of the taper thus behaves as a dielectric waveguide with a glass core (for cladding glass) and an air or free space cladding.

A dielectric optical waveguide can be characterised by a parameter, λ defined by the equation.

$$V = \frac{2\pi a}{\lambda_o}\left[n_1^2 - n_2^2\right]^{1/2}$$

where $a$ is the core radius, λo is the free space wavelength of the radiation propagating in the waveguide, $n_1$ is the core refractive index, $n_2$ is the cladding refractive index. For single mode propagation $V$ is less than 2.405. However if $V$ is too small the wave is only guided weakly by the waveguide. Typically for single mode glass fibre dielectric optical waveguides, $V = 2.3$ Coupling to a Ga As laser of the type shown in FIG. 1 is achieved by bringing the tapered end 8, see FIG. 2, up to the bloomed face 3 of the Ga As laser 2. The end of the fibre does not have to be in actual contact with the laser, only sufficiently close so that the major portion of the optical energy reflected by the end 8 of the fibre re-enters the laser. However in a tapered section the V value is reduced as a is reduced, the radiation field spreads out, and the core loses its guiding properties. Thus the degree of axial alignment between the Ga As laser and the fibre may be critical, depending on the value of $V$ of the end of the taper. The end of the taper however does not need to be particularly flat. When the tapered section and laser are suitably aligned the presences of the end 8 of the fibre, which is partially reflecting, restores the Q of the laser cavity and induces lasing. The coupling between laser and fibre may be optimised by coating the end of the fibre with a partially reflecting layer eg a multiple dielectric layer, which has a predetermined, optimum, co-efficient of reflection. The lasing filament induced in the laser is of a size and has an alignment such that the majority of the energy passes through the end 8 of the fibre. The energy than propagates through the first portion of the fibre 6 as though it was an optical waveguide with a glass core and air cladding. As the wave progresses along the taper into the dielectric optical waveguide proper, it passes into a section of the fibre in which the diameter of the core 7 steadily increases. In this region the wave is gradually coupled into the core. Thus the mere action of bringing the tip of the tapered dielectric optical waveguide into proximity with the laser is sufficient to induce lasing action, provided an appropriate voltage is applied across the laser at the same time, and ensures efficient coupling between the waveguide and laser.

In a second form of coupling termination for a dielectric optical waveguide, a section of special waveguide, FIG. 3b, is used. This waveguide is characterised by having a high refractive index core 7 ie there is a large difference in the refractive indices of the core 7 and cladding 6. This may be achieved by using, for the core, a glass having a high lead content, and hence a high refractive index, and for the cladding, a borosilicate glass with a much lower refractive index. Inspection of equation 1 shows that the high refractive index difference between core and cladding means that a core diameter of considerably less than usual must be employed to obtain mono mode propagation ie to give $V = 2.3$. The core diameter is thus of a suitable size to couple directly to the laser. Since the refractive index of the core is considerably higher than that of the cladding, the core will have a reflectivity significantly greater than the cladding. If a dielectric optical waveguide with a termination of the type just described is placed in proximity to the bloomed face of a Ga As laser, the Q of the laser cavity will have one of two values depending on whether the core or cladding is aligned with the laser. By adjusting the voltage across the laser to a suitable value, the laser will lase when the cavity has the higher of the two Q values but will not lase when it has the lower of the two Q values. This ensures that the lasing filaments will form only in alignment with the core of the termination section of the dielectric optical waveguide, thus ensuring efficient coupling of energy into the waveguide.

However some difficulty may be encountered in obtaining sufficient difference in reflection coefficient between core and cladding. This difficulty may be overcome if a reflecting layer is deposited on the core alone, the reflection coefficient at the core being thus increased to provoke the start of a filament.

The layer can be deposited using a photographic technique, and illuminating the fibre tail from its other end.

Matching the laser to a mono mode fibre to give maximum output is similar to matching a microwave oscillator to a waveguide. An analysis of the Optimum Reflectivity for laser mirrors is summarized in "Introduction to Optical Electronics" by A. Yariv published by HOlt, Rinehart and Winston 1972. It must necessarily be used with caution for the Ga As laser since it assumes, interalia, that the loss co-efficient, $\alpha$ nepers/meter, of the laser is small. It may nevertheless be useful in giving some in sight into the matching process.

Yariv has quoted the optimum transmission coefficient Topt at the output face or the mirror as:

$$Topt = -Li + \sqrt{goLi}$$

where
Li is the fractional loss per pass $= 1 - e^{-\alpha L}$ and
$e$ is the laser length,
go is the unsaturated gain per pass $= \gamma oL$ nepers.
Then, if uniform gain along the laser is assumed:

$$Topt = [\gamma oL(1-e^{-\alpha L})]^{1/2} + e^{-\alpha L} - 1$$

A plot of Topt against $e^{-\alpha L}$ is shown in FIG. 6 for a Ga As laser for various values of $\gamma oL$.

The optimum transmission coefficient is related to the characteristic impedances $Z_1$ and $Z_2$ on either side of the output face as:

$$Topt = \frac{4S}{(1+S)^2}$$

where $$S = \frac{Z_1}{Z_2}$$

On the fibre side the impedance is the characteristic impedance of the mono mode guide. On the laser side the impedance is that of a lasing filament considered as a self forming dielectric optical waveguide, and transformed by the bloomed matching section.

As an approximation, $$S \simeq \frac{n_1}{n_2}$$

where
$n_1 = 1 =$ refractive index of free space, and
$n_2 =$ effective refractive index of the fibre core.

FIG. 7 shows a plot of $e^{-\alpha L}$ against S for a typical double hetro structure laser and for a mesa structure laser with values of $\gamma oL$ of 1.25 and 1.75 respectively. FIG. 8 shows the normalised output of a laser as the transmission coefficient T is varied.

The value of S for optimum transmission is such that, in the usual range for $\alpha L$ and for $\gamma oL$, the implied refractive index of the fibre core is far too great to be realised without artificially increasing the reflecting coefficient by some such means as has already been suggested. Put another way, the long suffering Ga As laser radiating into free space with an S value of 1/3.5 is grossly over coupled. Direct matching should improve the Q of the resonator, reducing threshold current and limiting the frequency spread to some extent. The further reduction in current and frequency spread that could be obtained by under coupling may make it worthwhile to do so by increasing S at the expense of losing power. Considerations of degradation and bandwidth would have to be set off against the power available to the dielectric optical waveguide.

An improvement in coupling efficiency between the laser and dielectric optical waveguide may also be achieved by distorting the end of the fibre so that its section more nearly conforms to the geometry of the laser ie by flattening the end. FIG. 4a shows the normal section through a dielectric waveguide, in which both core 7 and cladding 6 are of substantually circular section. In FIG. 4b a flattened section is shown in which the core 7 and cladding 6 are of substantially elliptic section. The flattened section may be obtained by passing the fibre 10 between heated rollers 11 and 12, see FIG. 5. The 2 rollers which may be formed from hypodermic needles are biased together by spring action indicated at 13 and 14. The rollers may be heated to a temperature at which the glass of the dielectric optical waveguides softens by passing an electric current through them. Alternatively the fibres may be flattened by pressing between two precision quartz flats which are heated.

What is claimed is:

1. A method of launching optical energy, from an element including a GaAs laser having one of its reflective surfaces bloomed, into a dielectric optical waveguide including a tapered length terminating in an end section of minimum cross-sectional area, said method comprising the steps of:
   a. energizing the element so that it is capable of lasing only when an at least partially reflective surface is placed adjacent said bloomed surface; and
   b. positioning the dielectric optical waveguide with its end section of minimum cross-sectional area adjacent the bloomed surface so that lasing action is induced in the element.

2. A method as claimed in claim 1 wherein said end section has a partially reflecting coating formed thereon.

3. A method as claimed in claim 1 wherein said end section is circular.

4. A method as claimed in claim 1 wherein said end section is substantially elliptic.

5. A device for launching optical energy into a dielectric optical waveguide, comprising: a dielectric optical waveguide having a tapered length terminating in an end section of minimum cross-sectional area; and an element including a GaAs laser having one of its reflective surfaces bloomed, said end section disposed adjacent said bloomed surface.

6. A device as claimed in claim 5 wherein said end section has a partially reflecting coating formed thereon.

7. A device as claimed in claim 5 wherein said end section is circular.

8. A device as claimed in claim 5 wherein said end section is substantially elliptic.

* * * * *